United States Patent
Zhen

(10) Patent No.: US 10,863,608 B2
(45) Date of Patent: Dec. 8, 2020

(54) LIGHT-EMITTING DIODE DRIVING SYSTEM FOR TRANSMITTING SIGNAL BASED ON POWER LINE

(71) Applicant: JIANGMEN PENGJIANG TIANLI NEW TECH CO., LTD., Jiangmen (CN)

(72) Inventor: Zhaowei Zhen, Jiangmen (CN)

(73) Assignee: JIANGMEN PENGJIANG TIANLI NEW TECH CO., LTD., Jiangmen (CN)

( * ) Notice: Subject to any disclaimer, the term of this patent is extended or adjusted under 35 U.S.C. 154(b) by 0 days.

(21) Appl. No.: 16/445,195

(22) Filed: Jun. 18, 2019

(65) Prior Publication Data

US 2020/0296809 A1    Sep. 17, 2020

(30) Foreign Application Priority Data

Mar. 14, 2019    (CN) .......................... 2019 1 0194361

(51) Int. Cl.
*H05B 47/185*    (2020.01)
*H05B 45/10*    (2020.01)

(52) U.S. Cl.
CPC ........... *H05B 47/185* (2020.01); *H05B 45/10* (2020.01)

(58) Field of Classification Search
None
See application file for complete search history.

(56) References Cited

U.S. PATENT DOCUMENTS

| 8,292,804 B2 * | 10/2012 | Marka | A61B 90/35 600/249 |
| 2009/0189579 A1 * | 7/2009 | Melanson | H02M 3/33592 323/282 |
| 2018/0027626 A1 * | 1/2018 | Wang | H05B 45/46 315/186 |

FOREIGN PATENT DOCUMENTS

CN        105992424 B        9/2018

* cited by examiner

*Primary Examiner* — Amy Cohen Johnson
*Assistant Examiner* — Jianzi Chen

(57) ABSTRACT

A light-emitting diode driving system for transmitting a signal based on a power line comprising a switch unit, a control unit, a main power supply, and a secondary power supply, wherein the switch unit comprises a main input end, a secondary input end, an output end, and a controlled end. When the control unit is in an operating state, the switch unit is turned on. When the control unit outputs a high level signal to control the switch unit to be turned on, the main power supply outputs a main direct current power source to the switch unit, and when the control unit outputs a low level signal to control the switch unit to be turned on, the secondary power supply outputs a secondary direct current power source to the switch unit. The system can make the light emission effect of the light string more stable.

4 Claims, 3 Drawing Sheets

LIGHT-EMITTING DIODE DRIVING SYSTEM FOR TRANSMITTING SIGNAL BASED ON POWER LINE

CROSS-REFERENCE TO PRIOR APPLICATION

The present application claims the benefit of Chinese Patent Application No. 201910194361.7 filed on Mar. 14, 2019, the contents of which are incorporated herein by reference.

TECHNICAL FIELD

The present invention belongs to the technical field of LED lamp control, and in particular to a light-emitting diode driving system for transmitting a signal based on a power line.

BACKGROUND ART

At present, there is a light-emitting diode driving system for transmitting a signal based on a power line on the market, which is used for a light emission effect of an LED light string. The driving system can reduce signal lines, make a complicated light string net appear more concise, and is also more conducive to assembly.

For example, the Chinese invention patent with the authorization publication number CN105992424B discloses a technical solution entitled "LIGHT-EMITTING DIODE DRIVING SYSTEM", which uses a Zener diode, a capacitor and a PMOS switch as signal generation circuit to realize step control of an LED light string. This technical solution reduces the number of signal cables to a certain extent, but has obvious defects.

For example, the Zener diode is a voltage stabilizing diode, with an extremely low current for providing a signal. When a signal voltage is sent to the LED light string, the switch unit is in a turned-off state, and the LED light string is in a non-operating state, which causes the light string display effect of a terminal to be unstable, that is, the driving capability of the signal generation circuit is weak.

SUMMARY OF THE INVENTION

The technical problem to be solved by the present invention is to provide a light-emitting diode driving system for transmitting a lamp control signal based on a power line, which can improve the capability of a light emission signal of a light string driving a light emission effect of the light string, so that the light emission effect of the light string is more stable.

In order to solve the above technical problem, the technical solution of the present invention is as follows:

a light-emitting diode driving system for transmitting a signal based on a power line, for driving a light-emitting diode module light string to emit light and comprising at least a switch unit, a control unit, a main power supply, and a secondary power supply, the switch unit comprising a main input end, a secondary input end, an output end, and a controlled end, wherein the main input end is electrically connected to the main power supply source, the secondary input end is electrically connected to the secondary power supply source, the controlled end is electrically connected to the control unit, and the output end is electrically connected to a light-emitting diode module light string;

when the control unit outputs a high level signal to control the switch unit to be turned on, the main power supply outputs a main direct current power source to the switch unit, and when the control unit outputs a low level signal to control the switch unit to be turned on, the secondary power supply outputs a secondary direct current power source to the switch unit;

and under the control of the control unit, the switch unit outputs, to a light-emitting diode module light string, a light emission driving signal composed of the main and secondary direct current power supplies so as to maintain stable light emission.

Further, the switch unit is composed of a main switch and a secondary switch; the main switch comprises the main input end, the output end and the controlled end; the secondary switch comprises the secondary input end, the output end and the controlled end; and the main and secondary switches are turned on alternately, so that the switch unit is always in a turned-on state, and the LED light string is also always in a normal operating state.

Further, the relationship between the light emission driving signal and time changes in the form of a square waveform.

Further, the control unit comprises a power conversion device and a single-chip microcomputer control device.

The light-emitting diode driving system for transmitting a signal based on a power line provided in the present invention is used for driving a light-emitting diode (LED) to emit light, and controls light emission of an LED lamp by causing main and secondary power supplies having two different voltage values to cooperate with the control unit to provide a light emission driving signal of a square waveform for the LED, achieving different light emission effects.

Compared with the prior art, the present invention has the following beneficial effects:

I, the switch unit is always in a turned-on state, providing stable and uninterrupted power supplies and signals for the LED light string; and II, the uninterrupted power supplies and signals provided by the switch unit keep the LED light string always in an operating state, avoiding the phenomenon that the LED light string emits light unstably.

In the figures: 1—Diode driving system, 2—Switch unit, 3—Control unit, 4—Main power supply, 5—Secondary power supply, 6—Light-emitting diode module light string, 7—Alternating current power supply device, 21—Main switch, 22—Secondary switch, 31—Power conversion device, 32—Single-chip microcomputer control device, 201—Main input end, 202—Secondary input end, 203—Output end, 204—Controlled end, 210—Input end A, 211—Output end A, 212—Controlled end A, 220—Input end B, 221—Output end B, and 222—Controlled end B.

DETAILED DESCRIPTION OF EMBODIMENTS

The specific embodiments of the present invention are further described below with reference to the accompanying drawings. It is to be noted herein that the description of the embodiments is intended to help with the understanding of the present invention, but does not constitute a limitation of the present invention. Furthermore, the technical features involved in the various embodiments of the present invention described below may be combined with each other as long as they do not constitute a conflict with each other.

EMBODIMENTS

Figure 1:
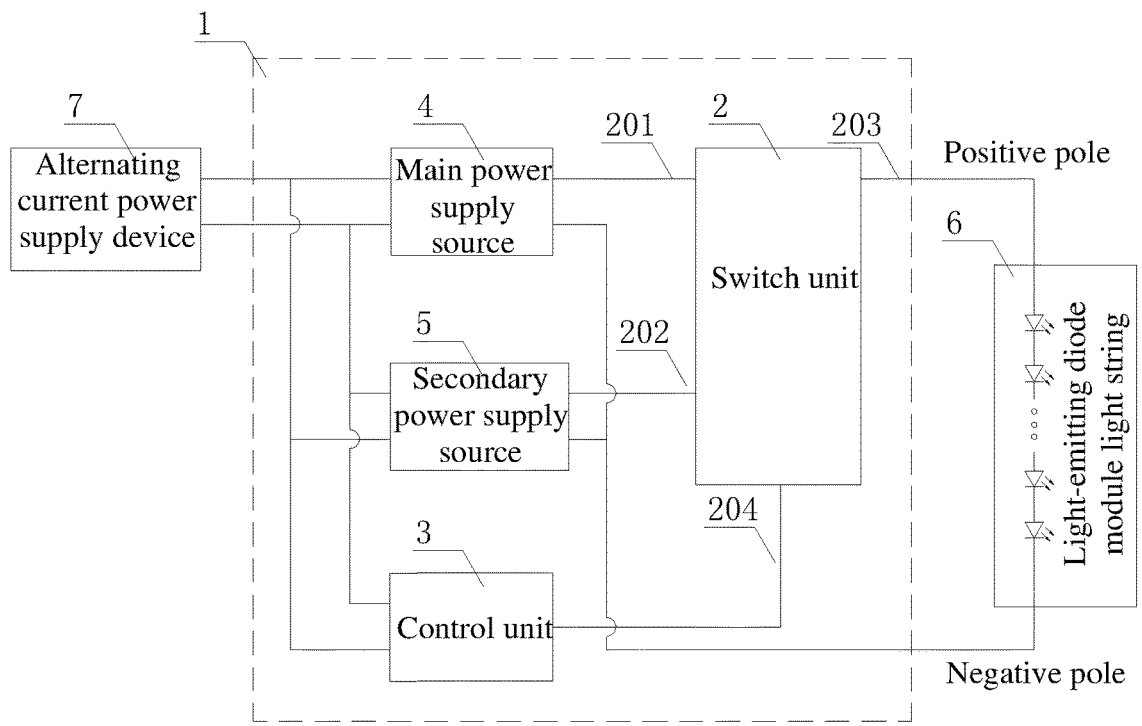
FIG. 1 is a block diagram of a circuit structure where a switch unit of an embodiment of the present invention is a PMOS transistor.
Figure 2:
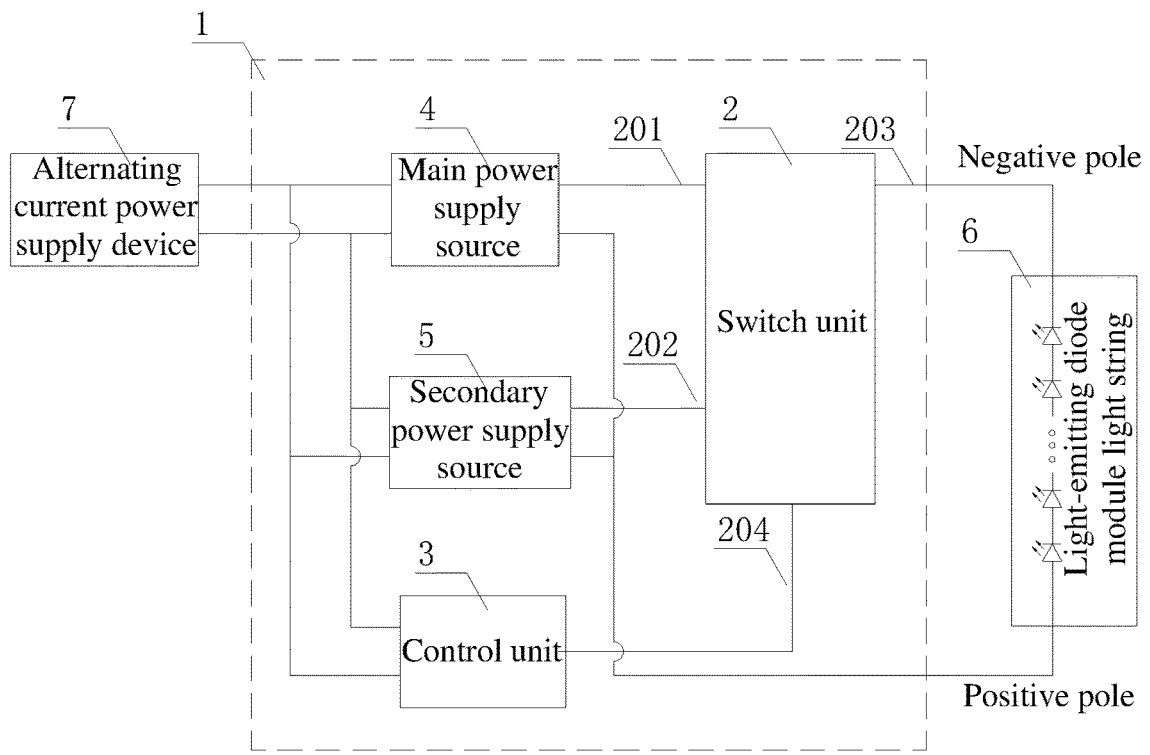
FIG. 2 is a block diagram of a circuit structure where a switch unit of an embodiment of the present invention is an NMOS transistor.

FIGS. 1 and 2 disclose circuit diagrams where a switch unit 2 is a PMOS transistor and an NMOS transistor, respectively, and corresponding switch units are used according to different connection modes. As shown in the figure, in the light-emitting diode driving system for transmitting a signal based on a power line provided in the present invention, an external alternating current power supply device 7 and a light-emitting diode module light string 6 are accessed to serve as a load. The system comprises a switch unit 2, a control unit 3, a main power supply 4, and a secondary power supply 5, the switch unit 2 comprising a main input end 201, a secondary input end 202, an output end 203, and a controlled end 204, wherein the main input end 201 is electrically connected to the main power supply 4, the secondary input end 202 is electrically connected to the secondary power supply 5, the controlled end 204 is electrically connected to the control unit 3, and the output end 203 is electrically connected to a light-emitting diode module light string 6.

When the control unit 3 outputs a high level signal to control the switch unit 2 to be turned on, the output end 203 outputs a power provided by the main power supply 4, and when the control unit 3 outputs a low level signal to control the switch unit 2 to be turned on, the output end 203 outputs a power provided by the secondary power supply 5; under the control of high and low level signals of the control unit 3, a light emission driving signal composed of the main power supply 4 and the secondary power supply 5 alternately and having the capability of driving a light-emitting diode is generated, and is finally output to the light-emitting diode module light string 6 by the output end 203.

Figure 3:
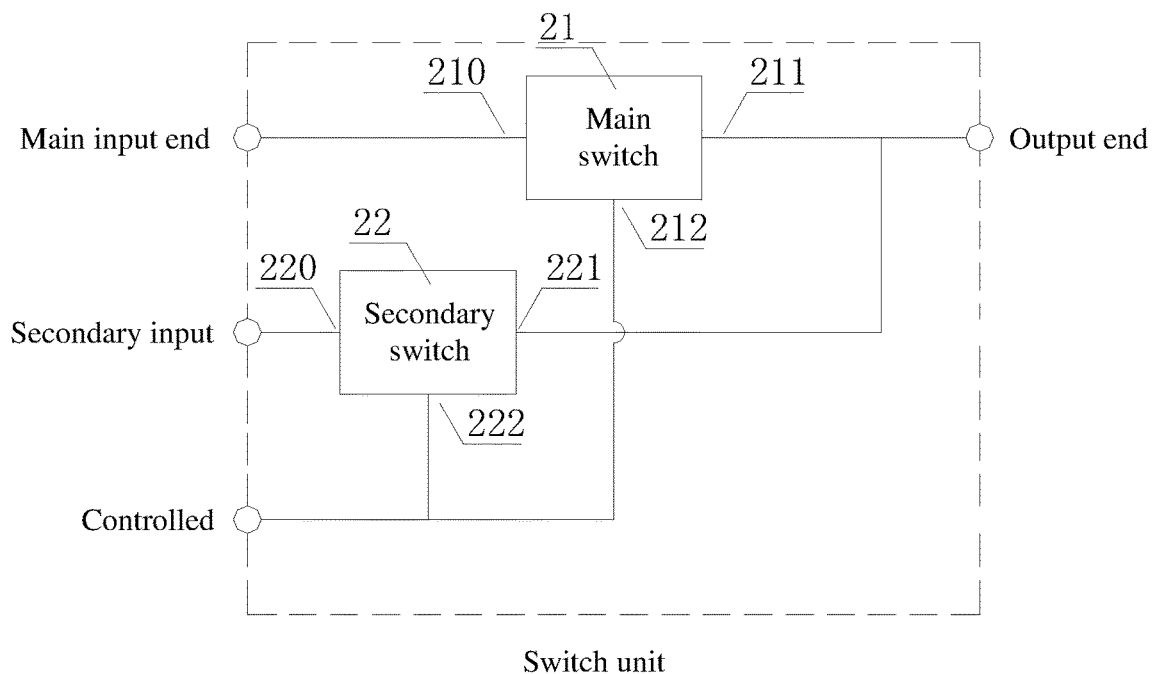
FIG. 3 is a block diagram of a circuit structure of the switch unit in FIG. 1.

As shown in FIG. 3, the main power supply 4 and the secondary power supply 5 cooperate with the control unit 3 to output different direct current power voltages to the switch unit. The switch unit 2 is divided into a main switch and a secondary switch, namely a main switch for receiving a high level signal and a secondary switch for receiving a low level signal, wherein the main switch comprises an input end A 210, an output end A 211, and a controlled end A 212; and the secondary switch comprises an input end B 220, an output end B 221, and a controlled end B 222. The controlled end B 222 and the controlled end A 212 are both connected to the controlled end 204, the output end A 211 and the output end B 221 are jointly connected to the output end 203, and the input end A 210 and the input end B 220 are sequentially and electrically connected to the main input end 201 and the secondary input end 202, respectively; and two switch element groups are turned on alternately, so that the switch unit is always in a turned-on state, and the LED light string is also always in a normal operating state.

Figure 4:
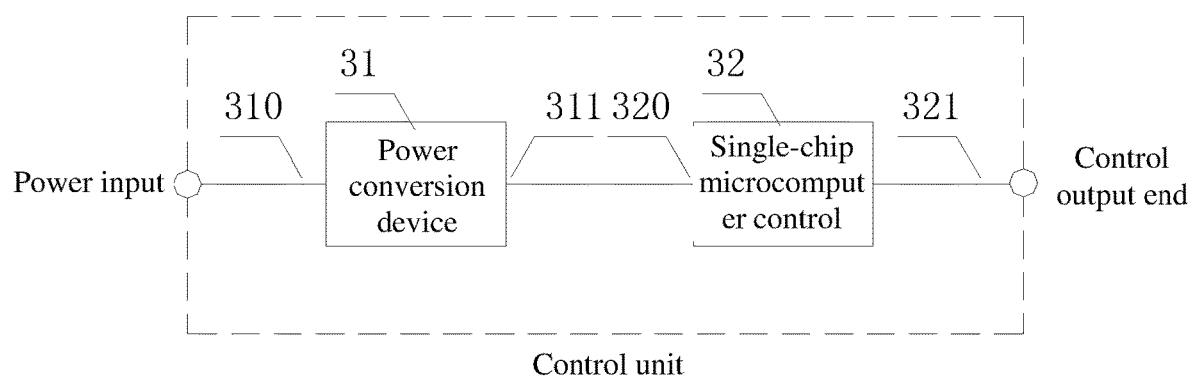
FIG. 4 is a block diagram of a circuit structure of a control unit in FIG. 1.

As shown in FIG. 4, the control unit 3 comprises a power conversion device 31 and a single-chip microcomputer control device 32. Through the power conversion device 31, a voltage of the external alternating current power supply device 7 is converted into a direct current voltage for outputting to a single-chip microcomputer, and then the single-chip microcomputer outputs a control signal of a square waveform to the switch unit, wherein the control signal is applied to the controlled end 204 of the switch unit.

Figure 5:
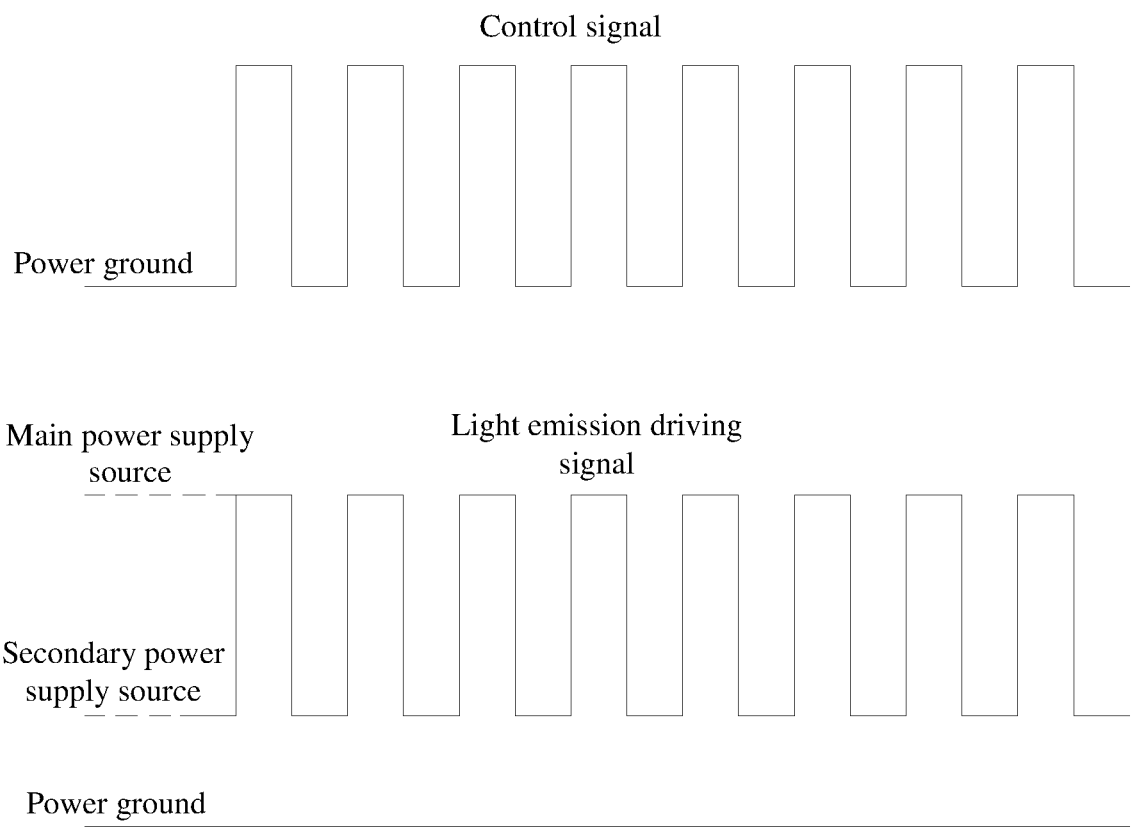
FIG. 5 is a waveform diagram of a light emission driving signal in an embodiment of the present invention.

As shown in FIG. 5, with respect to the light emission driving signal output in this embodiment, it is illustrated in the figure that high and low levels of the driving signal are provided by the main and secondary power supplies respectively, and the control signal is provided by the single-chip microcomputer.

For example, the light-emitting diode module light string 6 comprises ten light-emitting diode modules, each of which consumes a 5 V voltage drop at a high level and a 3 V voltage drop at a low level. Then, the alternating current power supply device 7 selects a 220V alternating current for output, the main power supply 4 outputs a 50 V voltage, and the secondary power supply 5 outputs a 30 V voltage, ensuring that each LED lamp in the light string at a load end has a sufficient voltage to stably emit light.

The embodiments of the present invention have been described in detail above with reference to the accompanying drawings, but the present invention is not limited to the described embodiments. For a person skilled in the art, various changes, modifications, substitutions and variations made to these embodiments still fall within the protection scope of the present invention without departing from the principles and spirit of the present invention.

The invention claimed is:

1. A light-emitting diode driving system for transmitting a signal based on a power line, for driving a light-emitting diode module light string to emit light and comprising:

at least a switch unit, a control unit, a main power supply, and a secondary power supply, wherein the switch unit comprises a main input end, a secondary input end, an output end, and a controlled end, the main input end is electrically connected to the main power supply, the secondary input end is electrically connected to the secondary power supply, the controlled end is electrically connected to the control unit, and the output end is electrically connected to a light-emitting diode module light string;

the switch unit is always turned on when the control unit is in an operating state; when the switch unit receives a high level signal from the control unit, the switch unit will be imported the main current by the main power supply source; when the switch unit receives a low level signal from the control unit, the switch unit will be imported the secondary current by the secondary power supply source;

under the operation of the control unit, the switch unit outputs, to the light-emitting diode module light string, a light emission driving signal composed of the main and secondary current power supplies so as to maintain stable light emission, and the light-emitting diode is always in an operating state.

2. The light-emitting diode driving system for transmitting a signal based on a power line according to claim 1, wherein the switch unit is composed of a main switch and a secondary switch; the main switch comprises the main input end, the output end and the controlled end; the secondary switch comprises the secondary input end, the output end and the controlled end; the main and secondary switches are turned on alternately, so that the switch unit is always in a turned-on state, and the LED light string is also always in a normal operating state.

3. The light-emitting diode driving system for transmitting a signal based on a power line according to claim 1, wherein the light emission driving signal and time presents a square waveform change.

4. The light-emitting diode driving system for transmitting a signal based on a power line according to claim 1, wherein the control unit comprises a power conversion device and a single-chip microcomputer control device.

* * * * *